(12) United States Patent
Takahiko

(10) Patent No.: US 7,243,927 B2
(45) Date of Patent: Jul. 17, 2007

(54) STEERING SKI FOR SNOW VEHICLE

(75) Inventor: Kubota Takahiko, Shizuoka (JP)

(73) Assignee: Yamaha Hatsudoki Kabushiki Kaisha, Iwata-shi, Shizuoka-ken (JP)

( * ) Notice: Subject to any disclaimer, the term of this patent is extended or adjusted under 35 U.S.C. 154(b) by 358 days.

(21) Appl. No.: 10/300,158

(22) Filed: Nov. 20, 2002

(65) Prior Publication Data

US 2003/0116932 A1 Jun. 26, 2003

(30) Foreign Application Priority Data

Nov. 20, 2001 (JP) .............................. 2001-354061

(51) Int. Cl.
  *B62B 17/00* (2006.01)
(52) U.S. Cl. .................. 280/28; 280/601; 280/609
(58) Field of Classification Search .................. 280/28, 280/601, 606, 609, 11.19, 11.223, 11.27, 280/11.24, 11.225, 11.226, 11.227, 11.26, 280/11.28, 7.13, 843; 180/180, 181, 182, 180/184, 186; 301/5.3; 36/11.5, 132, 136, 36/75; *A63C 17/04*
See application file for complete search history.

(56) References Cited

U.S. PATENT DOCUMENTS

| 211,322 | A | 1/1879 | Drawbaugh |
| 232,374 | A | 9/1880 | Smith et al. |
| 249,036 | A | 11/1881 | Gillotte |
| 253,557 | A | 2/1882 | Small |
| 423,594 | A | 3/1890 | Clark |
| 1,087,745 | A | 2/1914 | Ellis |
| 2,593,025 | A | 4/1952 | Hanson et al. |
| 3,395,411 | A | 8/1968 | Pope et al. |
| 3,605,926 | A | 9/1971 | Leonawicz |
| 3,675,939 | A | 7/1972 | Vik |
| 3,718,341 | A | 2/1973 | Westberg |
| 3,732,939 | A | 5/1973 | Samson |
| 3,817,544 | A | 6/1974 | Labelle |
| 3,856,318 | A | 12/1974 | Hollenbeck |
| 3,871,675 | A | 3/1975 | Lund |
| 4,077,639 | A | 3/1978 | Reedy |

(Continued)

FOREIGN PATENT DOCUMENTS

CA          517048          10/1955

(Continued)

OTHER PUBLICATIONS

English translation of Abstract of Canadian Patent 2378638, which was submitted with an IDS on Apr. 4, 2006.

*Primary Examiner*—Christopher P. Ellis
*Assistant Examiner*—Vaughn T. Coolman
(74) *Attorney, Agent, or Firm*—Knobbe, Martens, Olson & Bear LLP

(57) ABSTRACT

A ski for a snow vehicle includes a snow contacting portion that has a generally horizontal surface and a keel depending therefrom. The keel includes a keel base, a first inclined surface, and a second inclined surface. The keel base extends laterally from a longitudinal central plane of the ski to a lateral extent. The first inclined surface extends between the keel base and an inflection line that extends longitudinally. The second inclined surface extends between the inflection line and the generally horizontal surface. The inflection line is located no farther laterally from the longitudinal central plane than is the lateral extent of the keel base.

22 Claims, 7 Drawing Sheets

U.S. PATENT DOCUMENTS

| | | | |
|---|---|---|---|
| 4,083,577 A | 4/1978 | Ford | |
| 4,262,927 A | 4/1981 | Hochstrasser | |
| 4,491,333 A * | 1/1985 | Warnke | 280/28 |
| 4,509,771 A | 4/1985 | Nussbaumer | |
| 4,524,984 A | 6/1985 | Axelson | |
| 4,804,198 A | 2/1989 | Imai et al. | |
| 4,815,759 A | 3/1989 | Imai et al. | |
| 4,826,201 A | 5/1989 | Varan et al. | |
| 4,919,441 A | 4/1990 | Marier et al. | |
| 4,974,868 A | 12/1990 | Morris | |
| 5,040,818 A * | 8/1991 | Metheny | 280/609 |
| 5,108,124 A | 4/1992 | Pascal et al. | |
| 5,145,195 A * | 9/1992 | Campbell et al. | 280/28 |
| 5,145,201 A * | 9/1992 | Metheny | 280/609 |
| 5,165,709 A * | 11/1992 | Jacques | 280/28 |
| 5,222,749 A | 6/1993 | Bergstrom | |
| 5,251,718 A | 10/1993 | Inagawa et al. | |
| 5,340,144 A | 8/1994 | Eleneke | |
| 5,344,168 A * | 9/1994 | Olson et al. | 280/28 |
| 5,443,278 A | 8/1995 | Berto | |
| 5,462,304 A | 10/1995 | Nyman | |
| D366,014 S | 1/1996 | Lindquist et al. | |
| D367,018 S * | 2/1996 | Bernat | D12/7 |
| 5,586,614 A | 12/1996 | Kouchi et al. | |
| 5,599,030 A | 2/1997 | Campbell et al. | |
| 5,700,020 A | 12/1997 | Noble | |
| 5,829,545 A | 11/1998 | Yamamoto et al. | |
| 5,836,594 A | 11/1998 | Simmons | |
| D408,759 S | 4/1999 | Chapdelaine | |
| 5,964,311 A | 10/1999 | Yamamoto et al. | |
| 6,012,728 A * | 1/2000 | Noble | 280/28 |
| 6,102,413 A | 8/2000 | Khennache et al. | |
| 6,105,979 A * | 8/2000 | Desrochers | 280/28 |
| 6,267,392 B1 * | 7/2001 | Noble | 280/28 |
| 6,276,699 B1 | 8/2001 | Simmons et al. | |
| 6,331,008 B2 | 12/2001 | Cormican | |
| 6,378,889 B1 | 4/2002 | Moriyama et al. | |
| 6,431,561 B1 | 8/2002 | Hedlund | |
| D469,036 S | 1/2003 | Bruns et al. | |
| 6,513,612 B2 * | 2/2003 | Moriyama et al. | 180/182 |
| 6,520,512 B1 | 2/2003 | Lachance | |
| 6,631,912 B2 | 10/2003 | Metheny | |
| 6,692,009 B2 | 2/2004 | Lemieux | |
| 6,764,635 B2 | 7/2004 | Cormican | |
| 6,955,236 B2 | 10/2005 | Roberts et al. | |
| 6,991,056 B2 | 1/2006 | Roberts et al. | |
| 2001/0032744 A1 | 10/2001 | Moriyama | |
| 2002/0105166 A1 | 8/2002 | Lemieux | |
| 2002/0129982 A1 | 9/2002 | Harle et al. | |
| 2003/0024751 A1 | 2/2003 | Lebreux | |
| 2003/0034619 A1 | 2/2003 | Bergstrom | |

FOREIGN PATENT DOCUMENTS

| | | |
|---|---|---|
| CA | 650881 | 10/1962 |
| CA | 828641 | 12/1969 |
| CA | 897747 | 4/1972 |
| CA | 898310 | 4/1972 |
| CA | 916204 | 12/1972 |
| CA | 936197 | 10/1973 |
| CA | 954566 | 9/1974 |
| CA | 955292 | 9/1974 |
| CA | 960729 | 1/1975 |
| CA | 966172 | 4/1975 |
| CA | 967626 | 5/1975 |
| CA | 977391 | 11/1975 |
| CA | 981314 | 1/1976 |
| CA | 983072 | 2/1976 |
| CA | 987707 | 4/1976 |
| CA | 991685 | 6/1976 |
| CA | 1008111 | 4/1977 |
| CA | 1020989 | 11/1977 |
| CA | 1059173 | 7/1979 |
| CA | 2023228 | 8/1990 |
| CA | 1288789 | 9/1991 |
| CA | 2018591 | 12/1991 |
| CA | 2108537 | 10/1993 |
| CA | 2109241 | 10/1993 |
| CA | 2197618 | 2/1997 |
| CA | 2217279 | 10/1997 |
| CA | 2195166 | 7/1998 |
| CA | 2103849 | 10/1999 |
| CA | 2244520 | 1/2000 |
| CA | 2 304 411 | 4/2000 |
| CA | 2 329 578 | 10/2001 |
| CA | 2378638 A1 | 4/2002 |
| CA | 2191385 | 3/2005 |
| DE | 1132474 | 3/1958 |
| JP | 2000-289684 | 10/2000 |
| WO | WO 00/61431 | 10/2000 |

* cited by examiner

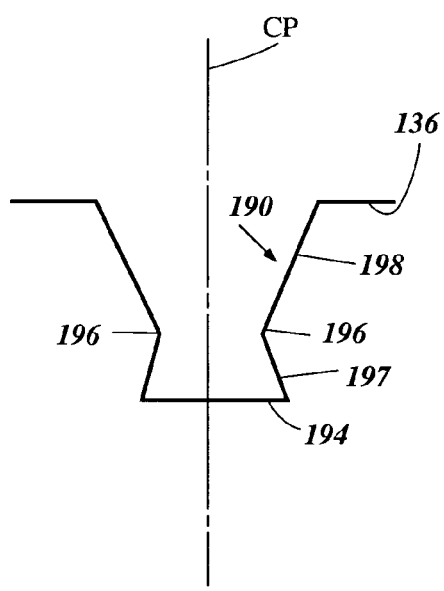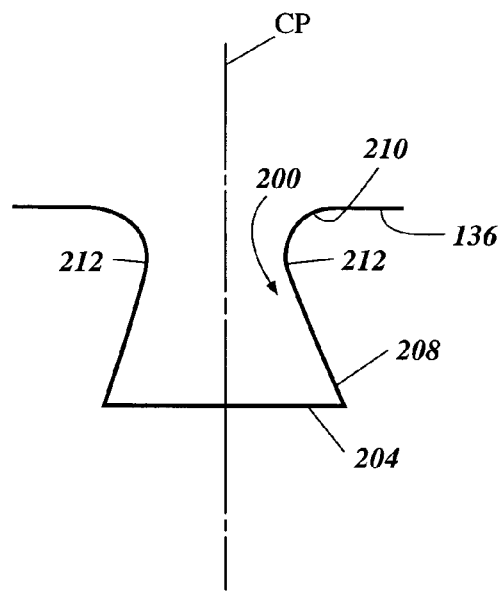
*Figure 7(a)*        *Figure 7(b)*

STEERING SKI FOR SNOW VEHICLE

PRIORITY INFORMATION

This application is based on and claims priority to Japanese Patent Application No. 2001-354061, filed Nov. 20, 2001, the entire contents of which is hereby expressly incorporated by reference.

BACKGROUND OF THE INVENTION

1. Field of the Invention

The present invention generally relates to skis for snow vehicles. More particularly, the present invention relates to steering skis that provide improved handling for such vehicles.

2. Description of the Related Art

The use of snowmobiles and similar snow vehicles has increased in popularity in recent years. These vehicles are being used both for utilitarian purposes and for sport and recreational purposes. The vehicles typically are adapted to travel across snow and/or ice and usually include at least one forward facing ski along with a driven belt track or other propulsion mechanism, e.g., wheels.

Snowmobiles are controlled through the use of weight shifting and steering movement of the skis. Snowmobile skis typically have an elongated keel that is positioned along the bottom of the ski. Typically, in a vertical section, the ski and keel combination form a trapezoidal transverse cross-section, with the narrow side of the trapezoid facing downward, as in FIG. 5(a). In generally icy or snow-packed conditions, the keel increases the bite of the ski by extending into the ice or snow-pack. By so extending, a steering force is transmitted between the keel and the ice or snow-pack (i.e., a ski/snow force) when the rider directs the ski to the left or to the right. The force directs the snowmobile to the left or to the right. In contrast, a keel-less ski would rely on a much smaller, friction force to direct the snowmobile to the left or to the right. Such a ski would be much less responsive because the ski/snow force would be relatively small. The keel thus improves handling of the snowmobile compared to a flat, keel-less ski in such conditions.

However, where the snow is new and/or deep, the snow flows obliquely across the face of the ski and the trapezoidal keel as the snowmobile skis are turned to the left or to the right. Because the snow flows obliquely across the ski and keel, the keel may rise upward over the snow and may not enhance the handling very much in such conditions. Because the trapezoidal keel only provides limited handling improvement in these conditions, the rider has to exert more force on a handlebar, i.e., the rider has to "oversteer" the snowmobile skis, in order to achieve the desired direction of travel. This can cause the rider to become tired.

SUMMARY OF THE INVENTION

A need therefore exists for an improved steering ski. The ski should improve handling in a wide variety of snow conditions. Preferably, the ski would include a keel that increases the responsiveness of the ski, e.g., that reduces the force that has to be exerted upon by the rider on the steering components (steering load) for the same ski/snow force.

In one ebodiment, a ski for a snow vehicle comprises a snow contacting portion and a ski mounting bracket. The ski mounting bracket is located opposite the snow contacting portion. The snow contacting portion includes a generally horizontal surface, a keel, and a wear bar. The keel depends from the generally horizontal surface. The wear bar depends from the keel. The keel includes a keel base, a first inclined surface, and a second inclined surface. The first inclined surface extends between the keel base and a longitudinally extending inflection line. The second inclined surface extends between the inflection line and the generally horizontal surface. The inflection line is located at an elevation above the wear bar when installed on a snow vehicle.

In another embodiment, a snowmobile comprises a body, a pair of skis disposed generally below a forward portion of the body, and a drive arrangement disposed generally below a rearward portion of the body. The snowmobile slides on the pair of skis. The snowmobile is powered in at least a forward direction by the drive arrangement. At least one of the skis includes a wear bar that depends from a keel. The keel includes a first inclined surface and a second inclined surface. The first inclined surface is generally vertically oriented and the second inclined surface extends from an upper portion of the first inclined surface. The first inclined surface and the second inclined surface form an inflection line therebetween.

In another embodiment, a ski for a snow vehicle includes a snow contacting portion and a ski mounting bracket opposite the snow contacting portion. The snow contacting portion has a generally horizontal surface and a keel depending therefrom. The keel includes a keel base and an inclined surface. The inclined surface forms an angle with the keel base of about ninety degrees or less.

In another embodiment, a ski for a snow vehicle includes a snow contacting portion and a ski mounting bracket opposite the snow contacting portion. The snow contacting portion has a generally horizontal surface and a keel depending therefrom. The keel includes a keel base, a first inclined surface, and a second inclined surface. The keel base extends laterally from a longitudinal central plane of the ski to a lateral extent. The first inclined surface extends between the keel base and an inflection line that extends longitudinally. The second inclined surface extends between the inflection line and the generally horizontal surface. The inflection line is located no farther laterally from the longitudinal central plane than is the lateral extent of the keel base.

BRIEF DESCRIPTION OF THE DRAWINGS

The above and other features, aspects and advantages of the present invention will now be described with reference to drawings that show a presently preferred arrangement that is intended to illustrate and not to limit the present invention and in which drawings:

FIGS. 7(a) and 7(b) are schematic transverse cross-sectioned views showing two additional embodiments of keels that can be incorporated into the steering ski of FIG. 1.

DETAILED DESCRIPTION OF THE PREFERRED EMBODIMENT

Figure 1:
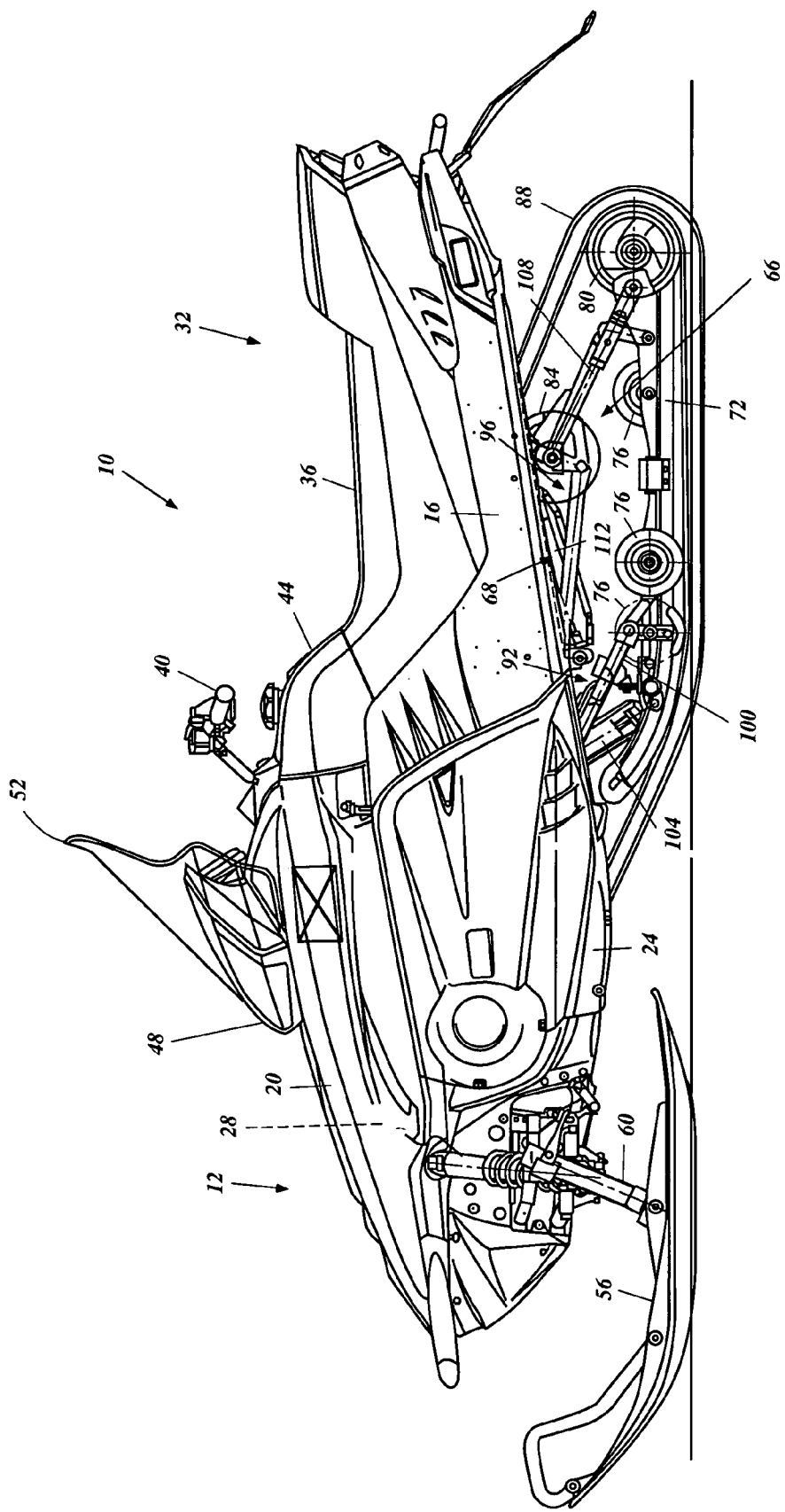
FIG. 1 is a side elevation view of a snowmobile having a pair of steering skis having a steering ski arranged and configured in accordance with certain features, aspects and advantages of the present invention.

With reference initially to FIG. 1, a snowmobile having a pair of steering skis constructed in accordance with an embodiment of the present invention is identified generally by the reference numeral 10. While described in the context of a snowmobile, it should be readily appreciated that the present invention also can be used in a variety of other applications, such as all terrain vehicles having at least one front ski, for instance. The snowmobile 10 includes a body assembly 12 made up of a number of parts which may be formed from suitable materials. The illustrated body assembly 12 includes a frame 16, an upper engine shroud 20, and a lower tray 24. The upper engine shroud 20 and the lower tray 24 are connected to the frame 16. Together the upper engine shroud 20 and the lower tray 24 define an engine compartment 28 that preferably houses an internal combustion engine (not shown) for powering the snowmobile 10.

The illustrated body assembly 12 further includes a rear portion 32 that accommodates a seat 36, which is adapted to seat one or more riders in a straddle fashion. A handlebar assembly 40 is positioned in front of the seat 36 for operation by the rider. A fuel tank 44 is positioned generally between the handlebar assembly 40 and the seat 36.

The illustrated upper engine shroud 20 includes a raised portion 48 located in front of the handlebar assembly 40. The raised portion 48 carries a windshield 52, which generally protects the rider operating the snowmobile 10 from wind, snow, branches and other objects.

Figure 2:
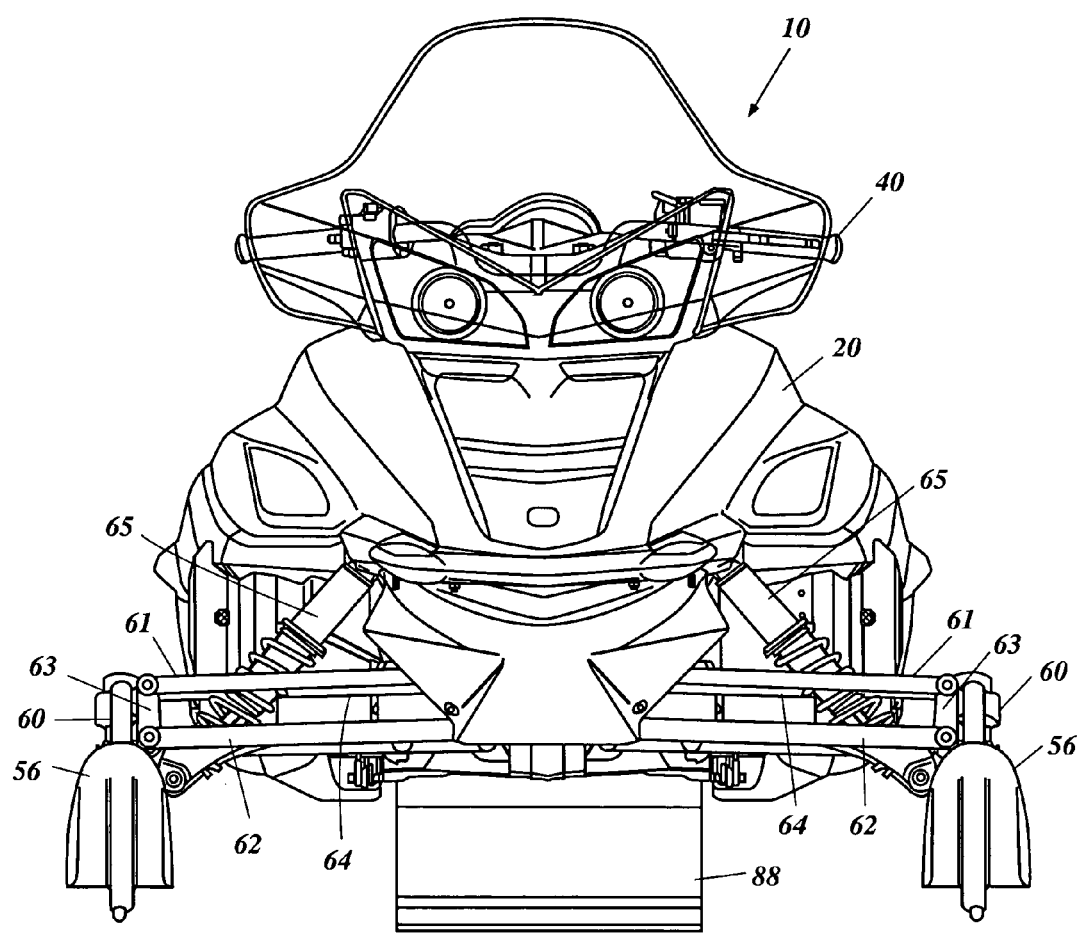
FIG. 2 is a front view of the snowmobile of FIG. 1.

A pair of front skis 56, having a construction described below, are supported in a manner also to be described at a forward portion of the body 12 with a set of suspension struts 60. The suspension struts 60 accommodate steering movement of the skis 56. FIG. 2 shows that in one embodiment the struts 60 are interconnected with tie rods so that they can be steered in unison. In one embodiment, a right upper tie rod 61 and a right lower tie rod 62 are pin joined to a right tie-rod bracket 63 that is connected to the right suspension strut 60. Similarly, a left upper tie rod 61 and a left lower tie rod 62 are pin joined in the illustrated embodiment to a left tie-rod bracket 63 that is connected to the left suspension strut 60. At least one of the skis 56 preferably has a steering link (not shown) that is connected to a steering rod 64. The handlebar assembly 40 is linked to the front skis 56 through the steering rod 64 and a steering column (not shown) such that movement of the handlebar assembly 40 results in a corresponding steering movement of the front skis 56, as is known in the art. Each of the skis 56 is also suspended from the frame 16 by a shock absorber 65.

A carriage assembly 66 is supported at the rear portion 32 of the body 12 below the seat 36 by a rear suspension system 68. The carriage assembly 64 includes a pair of guide rails 72 that carry a plurality of lower idler rollers 76, a main rear idler roller 80, and an upper idler roller 84.

The guide rails 72 and idler rollers 76, 80, 84, cooperate to form a path around which a drive track 88 is trained. The drive track 88 is driven by an output shaft (not shown) of the engine through a suitable variable belt-type transmission (not shown), as is well known in the art.

The drive track 88 is suspended relative to the body 12 by means of a front suspension system, indicated generally by the reference number 92, and a rear suspension system, indicated generally by the reference numeral 96. The front and rear suspension systems 92 and 96 are connected to the guide rails 72 which back up the drive track 88, as discussed above. The front suspension system 92 includes a link rod 100 and a tubular shock absorber 104. The link rod 100 and the shock absorber 104 extend between the guide rails 72 and the frame 16. The rear suspension system 96 includes a control rod 108 and a tubular shock absorber 112. The front and rear suspension systems 92, 96 of the snowmobile 10 operate in a known manner.

Figure 3:
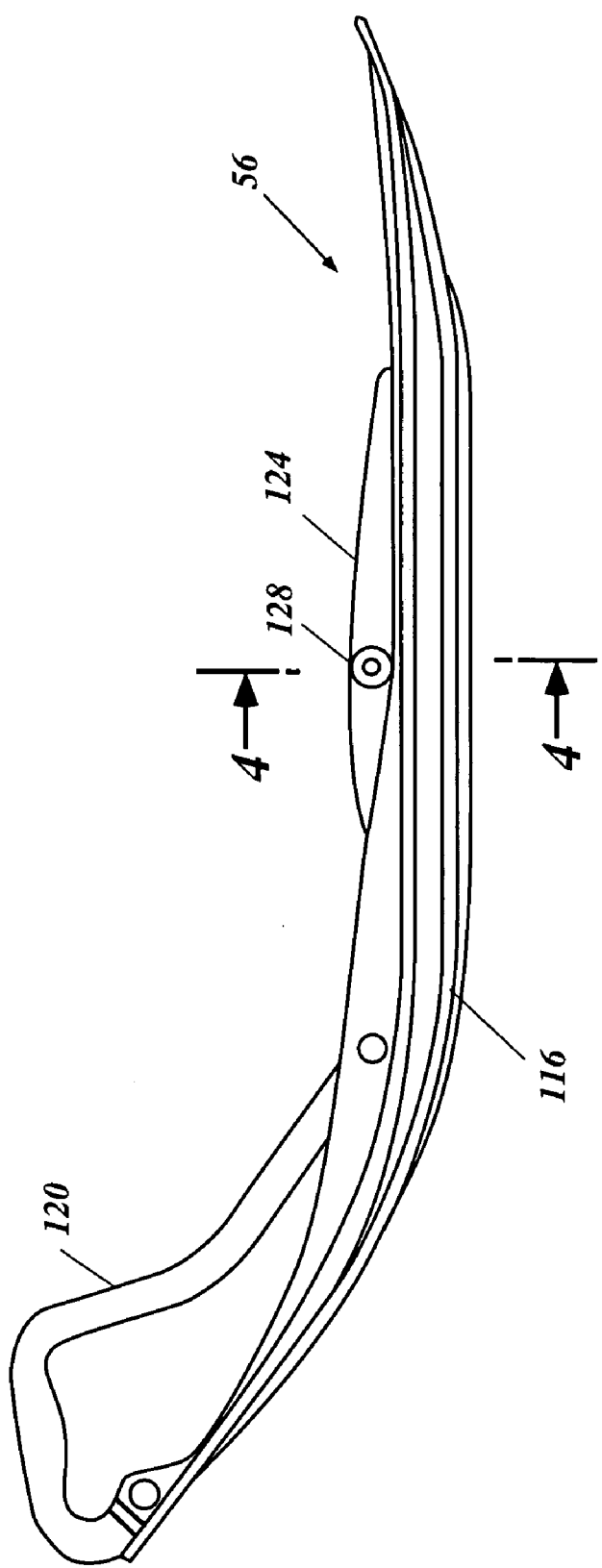
FIG. 3 is a side elevation view of the steering ski of FIG. 1.
Figure 4:
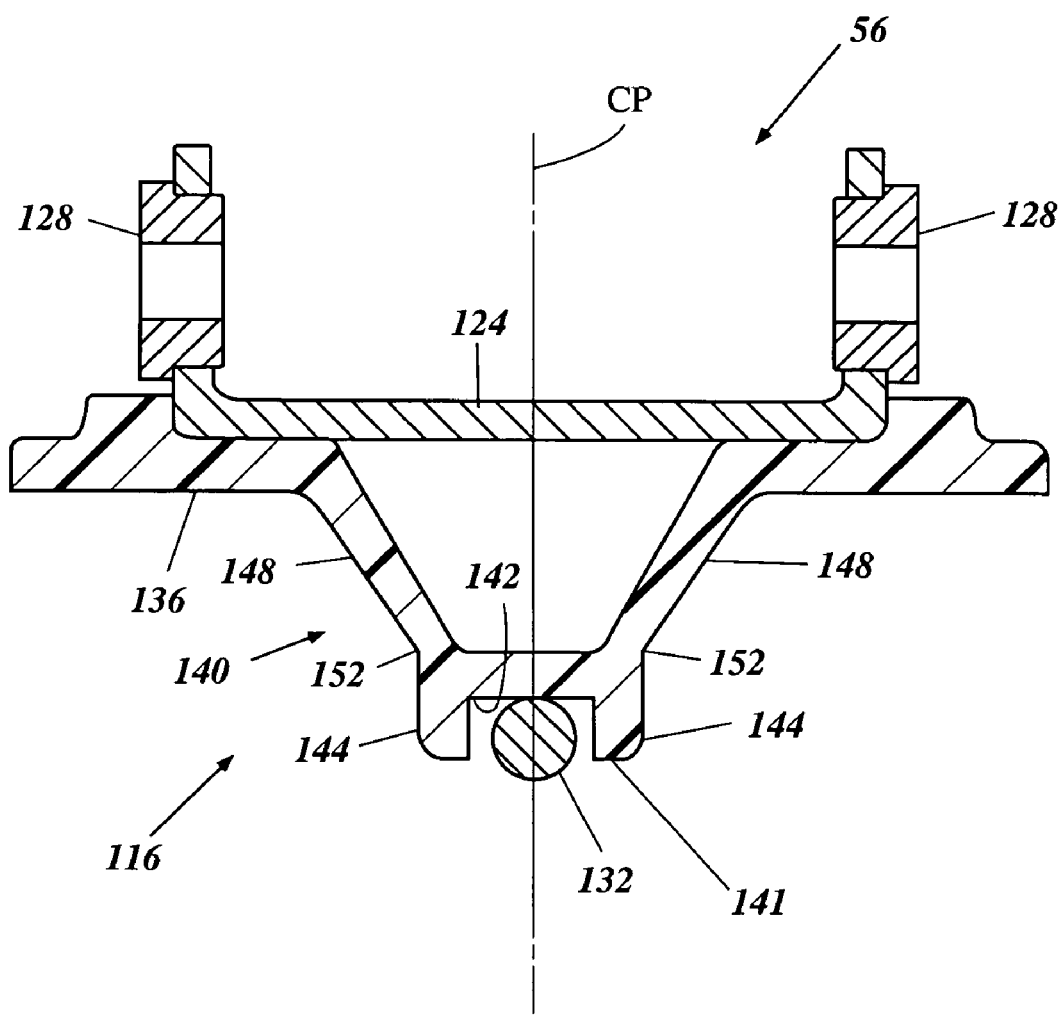
FIG. 4 is an enlarged transverse cross-sectioned view of the steering ski taken along the section line 4—4 in FIG. 3.
Figure 5:
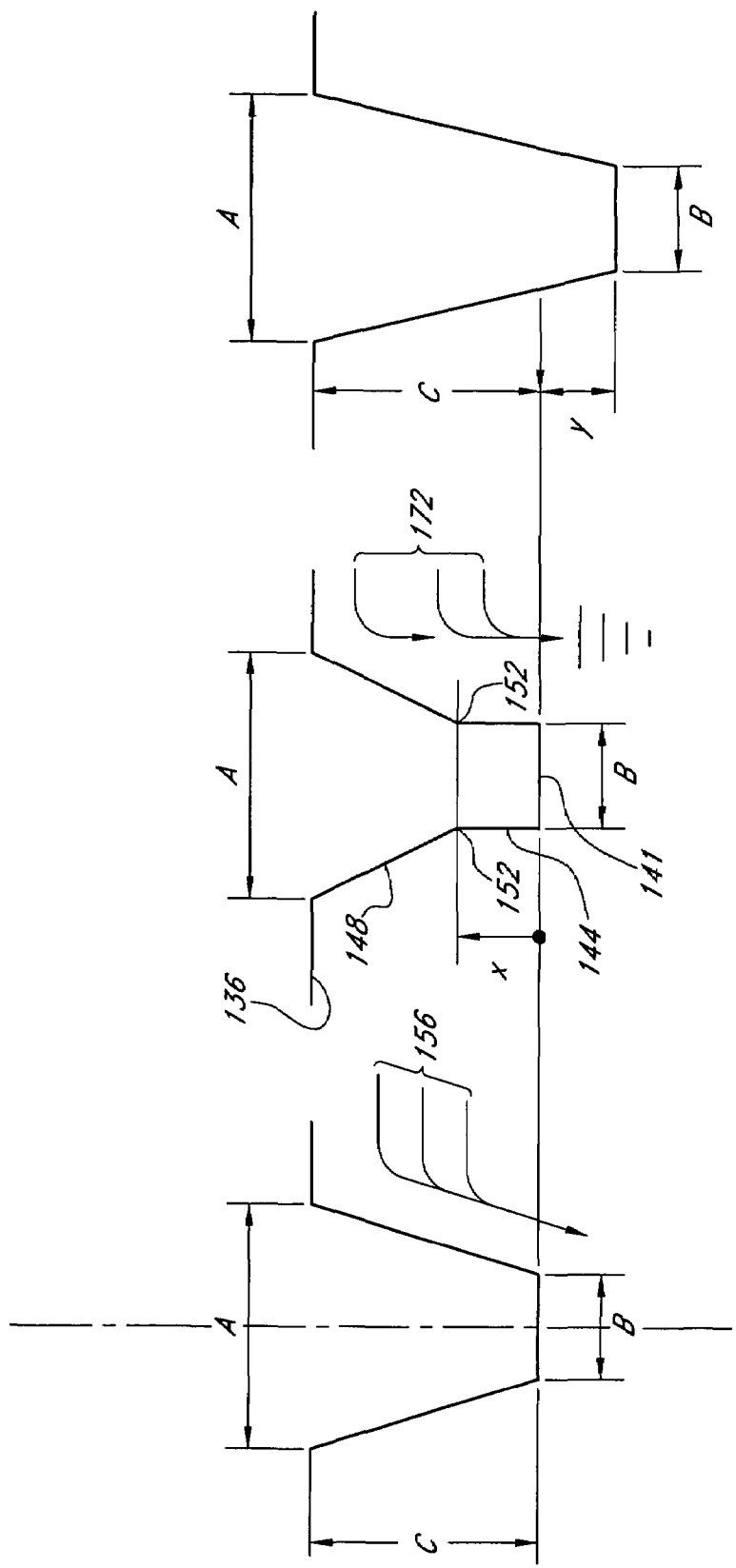
FIGS. 5(a)–5(c) are schematic transverse cross-sectioned views showing three configurations of a keel of a steering ski.

FIGS. 3 and 4 illustrate one embodiment of the steering ski 56. The ski 56 has a snow contacting portion 116, a reinforcing handle 120, a ski mounting bracket 124, and a pair of centrally disposed pivot collars 128. The snow contacting portion 116 has many different embodiments, some of which are discussed below in connection with FIGS. 4–7(b). The reinforcing handle 120 allows a rider to redirect the steering skis 56 manually and to move the snowmobile 10 without running the engine. The ski mounting bracket 124 is located on the opposite side of the ski 56 from the snow contacting portion 116. In one embodiment, the pivot collars 128 are bushings that extend through a vertical side-wall of the ski mounting bracket 124. In one embodiment, the ski mounting bracket is made of aluminum, but any suitable material can be used. The steering ski 56 can thus be coupled to the suspension struts 60 for rotation in a known manner, which permits the skis to articulate to follow the terrain.

FIG. 4 shows an enlarged transverse cross sectioned view of the ski 56 taken along the section plane 4—4 shown in FIG. 3. In one embodiment, the snow contacting portion 116 of the ski 56 comprises a wear bar 132, a generally horizontal surface 136, i.e., a surface that is generally horizontally oriented when the ski is mounted to the snowmobile 10, and a keel 140. Any of the embodiments of the invention discussed herein can be integrally formed. For example, the generally horizontal surface 136 and the keel 140 of the snow contacting portion 116 can be integrally formed. On the other hand, any of the embodiments of the invention discussed herein can be separate pieces that are assembled together. For example, the generally horizontal surface 136 and the keel 140 of the snow contacting portion 116 can separate pieces that are assembled together.

The keel 140 can be made of any suitable material, such as a tough, resin-based polymer. Preferably, the keel 140 extends over a significant portion of the snow contacting portion 116 of the ski 56. The length can vary, however. In one embodiment, the generally horizontal surface 136 is substantially planar (side view) in construction though it can comprise a longitudinal arcuate shape, or any other suitable shape. The keel 140 depends from the generally horizontal surface 136 to a keel base 141. In one embodiment, the keel base 141 extends laterally from a longitudinal central plane CP of the ski 56 (discussed more fully below) to a lateral extent.

The wear bar 132 depends from the keel base 141 and desirably is the lowest surface of the front end of the snowmobile 10. In one embodiment, the keel base 141 is provided with a groove 142 that houses at least a portion of the wear bar 132. As is known, the wear bar 132 reduces the wear of the other components of the steering ski 56 and thereby extends the life of the ski 56. Thus, the wear bar 132 is preferably made of a tough material, such as a hard metal material, e.g. iron.

The keel 140 advantageously is symmetrical about the longitudinal central plane CP. In one embodiment, the keel 140 has, on both sides of the longitudinal central plane CP, a first inclined surface 144 and a second inclined surface 148 that extends between the first inclined surface 144 and the generally horizontal surface 136. As used herein, "inclined surface" is a broad term that includes any surface that is not horizontal, e.g., a vertical surface. The keel 140 in this arrangement thus provides an inflection line 152 that is located at a junction of the first inclined surface 144 and the second inclined surface 148. The location of the inflection line 152 can vary. For example, in one embodiment, the inflection line 152 is located directly above (with some tolerance allowed to each side) the lateral extent of the keel base 141. As used herein, "directly above" signifies that when the ski 56 is mounted on the snowmobile 10, the inflection line 152 is vertically over the lateral extent of the keel base 141 in this embodiment. It also may signify that a line connecting two points in question would be generally parallel to the longitudinal central plane CP. In another embodiment, the inflection line 152 is located laterally between the lateral extent of the keel base 141 and the longitudinal central plane CP of the ski 56, i.e., the lateral distance from the longitudinal central plane CP to the inflection line 152 is less than the lateral distance from the longitudinal central plane CP to the keel base 141. See, e.g., FIG. 7(a). In another embodiment, the relative size of the first and second inclined surfaces 144, 148 cause the inflection line 152 to be closer to the keel base 141 than it is to the generally horizontal surface 136. In another embodiment, the relative size of the first and second inclined surfaces 144, 148 cause the inflection line 152 to be closer to the generally horizontal surface 136 than it is to the keel base 141. Of course, the inflection line 152 could be positioned midway between the generally horizontal surface 136 and the keel base 141.

The inflection line 152 advantageously provides a distinct location where the direction of flow of the snow along the keel 140 is caused to change by the inclined surfaces 144, 148 of the keel 140. As discussed in more detail below, this change of direction increases the forces that are transmitted between the ski 56 and the snow or ice, thereby improving the steering response of the snowmobile 10.

FIG. 5(a) shows schematically a transverse cross-section view of a conventional steering ski and keel. As discussed above, snowmobile ski keels typically have a trapezoidal transverse cross-section shape, with the narrower side of the trapezoid located farthest from the rest of the ski. The transverse cross-section of a typical keel shows a first keel width A, which is the width of the wider side of the keel located nearest to the ski, a keel depth C, and a second keel width B. The second keel width B is the width of the narrower side of the keel, which is the side of the keel located farthest from the rest of the ski. Typically, the first width A is equal to the keel depth C. The transverse cross-section of the typical keel also includes an inclined side that extends between the wider side of the keel and the narrower side of the keel on each side of the longitudinal central plane CP. As discussed above, the inclined sides of the conventional keel appear as straight-lines in transverse cross-section.

Arrows 156 in FIG. 5(a) indicate that, during a turn, snow impacting a steering ski having this conventional keel flows obliquely across the ski and the keel as the snowmobile skis are manipulated by the rider. Accordingly, the ski and keel generally provide insufficient resistance to the flow of snow in deep and/or new snow conditions. Thus, the handling improvement provided by the conventional ski and keel combination is inadequate, particularly in such conditions.

FIG. 5(b) shows further details of the keel 140 illustrated in FIG. 4. In particular, in one embodiment, the inflection line 152 is located between the first inclined surface 144 and the second inclined surface 148 a distance X from the keel base 141. In the embodiment of FIG. 5(a), the keel 140 comprises a first keel width A nearest the generally horizontal surface 136 and a second keel width B at the keel base 141. Arrows 172 illustrate that the snow flowing against the side of the steering ski employing the keel 140 is caused to change directions at the inflection line 152. Snow is thereby directed downward directly into the ground at the keel base 141. The redirection increases the lateral forces imparted at the keel 140. Thus, the redirection of the snow at the inflection line 152 improves the transmission of forces between the snow and the ski, and thereby improves the handling response of the ski 56, as is discussed more fully below in connection with FIG. 6.

FIG. 5(c) is a modification of the conventional keel of FIG. 5(a). Like the keel of FIG. 5(a), the keel of FIG. 5(c) is trapezoidal in shape when viewed from a transverse cross-section. The keel provides a first keel width of A, a second keel width of B, and a keel depth C+Y. In other words, the keel of FIG. 5(c) is like the keel of FIG. 5(a), except it has a keel depth that is greater by an extension length Y. The extension length Y is chosen so that the forces transmitted between the conventional keel and the snow are equal to those transmitted in the embodiment of FIG. 5(b). As discussed in more detail below, this provides a comparison of the steering load associated with the conventional ski and with the embodiment shown in FIG. 5(b), as discussed more fully below in connection with FIG. 6. As can be seen, the arrangement of FIG. 5(b) has a smaller volume in the keel compared to that of FIG. 5(c) and thus achieves improved steering while reducing weight and material costs.

Figure 6:
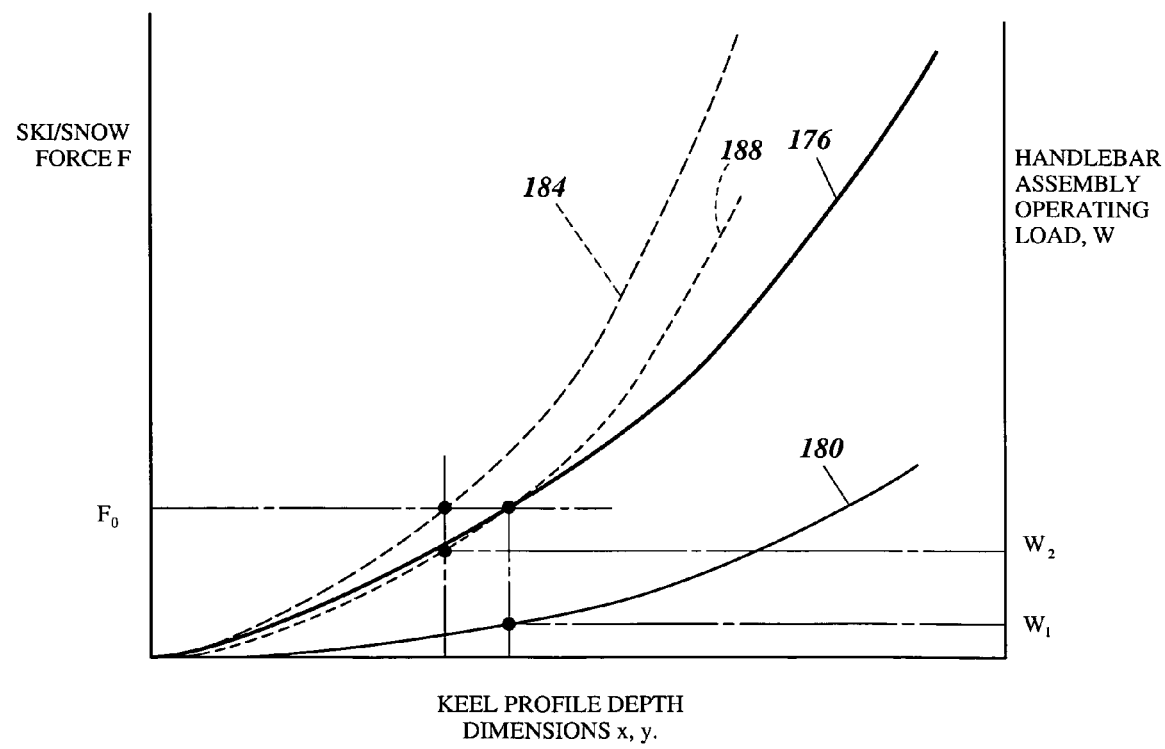
FIG. 6 is a graph that illustrates how the side force and the handlebar assembly operating load compare between one embodiment and a comparable conventional steering ski.

FIG. 6 is a graph that illustrates how the ski/snow force and the handlebar assembly operating load compare between one embodiment of the steering ski claimed below and a conventional ski having a trapezoidal cross-section keel. A first set of lines corresponding to the embodiment of the keel 140 of FIGS. 4 and 5(b) includes a line 176 that indicates the relationship between the location of the inflection line 152 (i.e., the vertical distance X) and, on the left-side axis, the ski/snow force F. The first set of lines also includes a line 180 that indicates the relationship between the location of the inflection line 152 (i.e., the vertical distance X) and, on the right-hand axis, the operating load W of the handlebar assembly 40. In FIG. 6, $F_0$ is the optimum force to be transmitted between the ski and the snow. $F_0$ can be based on the material used for the keel 140 or other components of the ski 56, on the expected friction between the snow and the ski, on other factors known to those skilled in the art, or on a combination of factors. In any event, as can be seen by the line 180, the operating load $W_1$ of the handlebar assembly 40 for the ski 56 associated with the force $F_0$ is relatively low.

FIG. 6 shows a second set of lines corresponding to the keel of FIG. 5(c). The second set of lines includes a line 184 that indicates the relationship between the depth of the keel of FIG. 5(c) (i.e., the extension length Y) and, on the left-side axis, the ski/snow force $F_0$. The second set of lines also includes a line 188 that indicates the relationship between the keel extension length Y and, on the right-hand axis, the operating load $W_2$ of the handlebar assembly 40 for the conventional ski with the keel shown in FIG. 5(c). As can be seen the lines 184 and 188 are much steeper than the corresponding lines 176 and 180. As a result, for the same force $F_0$, the keel of FIG. 5(c) requires a higher handlebar assembly operating load $W_2$. Thus, it is demonstrated that the keel illustrated by the embodiment shown in FIGS. 4 and 5(b), as well as other keels within the scope of the below claims, provides an improved combination of relatively high force transmitted between the ski and the snow (i.e., the ski/snow force) and relatively low handlebar assembly operating load. Thus, the preferred embodiment of the ski disclosed herein is more responsive to the rider. In addition, as discussed above, the ski/snow force F0 is achieved by the embodiment of FIGS. 4 and 5(b) using substantially less material than is used in the conventional ski modified as shown in FIG. 5(c).

FIGS. 7(a) and 7(b) illustrate two further embodiments of keels in accordance with further aspects of the preferred embodiment. In FIG. 7(a), a keel 190 depends from the generally horizontal surface 136 of a snowmobile ski. As discussed in connection with FIG. 4, the snowmobile ski and the keel 190 associated therewith are symmetrical about a longitudinal central plane CP. The keel 190 includes a keel base 194 that extends laterally from the longitudinal central plan CP and that is the portion of the keel 190 that is located farthest from the generally horizontal surface 136 of the ski. An inflection line 196 is shown in the transverse cross-section view of FIG. 7(a) that is located between the keel base 194 and the generally horizontal surface 136. As discussed above, the lateral location of the inflection line 196 is between the lateral extent of the keel base 194 and the longitudinal central plane CP. As in the keel 140, a first inclined surface 197 is provided between the keel base 194 and the inflection line 196 and a second inclined surface 198 is provided between the inflection line 196 and the generally horizontal surface 136.

In FIG. 7(b), a keel 200 is provided that depends from a generally horizontal surface 136 of a snowmobile ski. As discussed in connection with FIG. 4, the snowmobile ski and the keel 200 associated therewith are symmetrical about the longitudinal central plane CP. The keel 200 includes a keel base 204 that extends laterally from the longitudinal central plan CP and that is the portion of the keel 200 that is located farthest from the generally horizontal surface 136. A first inclined surface 208 extends from the keel base 204 toward the generally horizontal surface 136. In one embodiment, the inclined surface 208 forms an angle of about ninety degrees or less with the keel base 204. In one embodiment, a radius portion 210 is provided between the inclined surface 208 and the generally horizontal surface 136. The radius portion 210 adjoins the inclined surface 208 smoothly at a portion 212. In one embodiment, the lateral location of the portion 212 is directly above the lateral extent of the keel base 204. In another embodiment, the lateral location of the portion 212 is between the lateral extent of the keel base 204 and the longitudinal central plane CP. Thus, in one embodiment, the inclined surface 208 of the keel 200 faces generally upwardly. In another embodiment, the inclined surface 208 is generally parallel to the longitudinal central plane CP.

Although the present invention has been described in terms of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A ski for a snow vehicle comprising a snow contacting portion and a ski mounting bracket opposite the snow contacting portion, the snow contacting portion comprising a generally horizontal surface, a keel depending from the generally horizontal surface, and a wear bar depending from the keel, the keel comprising a keel base that contacts the snow surface, a first inclined surface, and a second inclined surface, the first inclined surface extending between a first inflection point adjacent to the keel base and a second inflection point intersected by a longitudinally extending inflection line, the second inclined surface extending between the inflection line and a third inflection point adjacent to the generally horizontal surface, the inflection line being located at an elevation above the wear bar, wherein the second inclined surface is between a vertical central longitudinal plane of the ski and a first straight line extending between the first inflection paint and the third inflection point, and wherein the third inflection point is between the vertical central longitudinal plane and a second straight line extending between the second inflection point and an outer edge of the ski.

2. The ski for snow vehicle of claim 1, wherein the second inclined surface faces downwardly when the ski is coupled with the snow vehicle.

3. The ski for snow vehicle of claim 2, wherein the first inclined surface is generally parallel to a central longitudinal plane of the ski.

4. The ski for snow vehicle of claim 2, wherein the first inclined surface faces upwardly.

5. The ski for snow vehicle of claim 1, wherein the first inclined surface faces upwardly.

6. The ski for snow vehicle of claim 1, wherein the first inclined surface is generally vertically oriented when the ski is coupled with the snow vehicle.

7. The ski for snow vehicle of claim 1, wherein the second inclined surface comprises an arcuate surface that extends firm the inflection line to the generally horizontal surface.

8. The ski for snow vehicle claim 7, wherein the first inclined surface faces upwardly.

9. The ski for snow vehicle of claim 1, wherein the keel base extends generally perpendicularly from a central longitudinal plane of the ski to a lateral extent, the inflection line being located at a lateral location between the lateral extent of the keel base and the central longitudinal plane.

10. The ski for snow vehicle of claim 1, wherein the keel base extends generally perpendicularly from a central longitudinal plane of the ski to a lateral extent, the inflection line being located directly above the lateral extent when the ski is coupled with the snow vehicle.

11. The ski for snow vehicle of claim 1, wherein the inflection line is closer to the generally horizontal surface than it is to the keel base.

12. The ski for snow vehicle of claim 1, wherein the inflection line is closer to the keel base than it is to the generally horizontal surface.

13. The ski for snow vehicle of claim 1, wherein the second inclined surface is inclined downwardly from the third inflection point to the second inflection point when the ski is coupled with the snow vehicle.

14. A ski for a snow vehicle comprising a snow contacting portion and a ski mounting bracket opposite the snow contacting portion, the snow contacting portion comprising a generally horizontal surface, a keel depending from the generally horizontal surface, the keel comprising a keel base that contacts the snow surface and a first inclined surface, the first inclined surface forming an angle with the keel base of about ninety degrees or less, a transverse cross-section of the ski including a first inflection point adjacent to the keel base, a second inflection point between the first inclined surface and a second inclined surface, and a third inflection point located between the second inclined surface and the generally horizontal surface, wherein the second inclined surface is located between a first straight line extending between the first and third inflection points and a vertical central longitudinal plane of the ski, and wherein the third inflection point is between the vertical central longitudinal plane and a second straight line extending between the second inflection point and an outer edge of the ski.

15. The ski for snow vehicle of claim 14, wherein the keel further comprises a radius portion provided between the inclined surface and the generally horizontal surface.

16. The ski for snow vehicle of claim 14, further comprising a wear bar depending from the keel base of the keel.

17. The ski for snow vehicle of claim 14, wherein the second inclined surface is inclined downwardly from the third inflection point to the second inflection point when the ski is coupled with the snow vehicle.

18. A ski for a snow vehicle comprising a snow contacting portion and a ski mounting bracket opposite the snow contacting portion, the snow contacting portion comprising a generally horizontal surface and a keel depending from the generally horizontal surface, the keel comprising a keel base that contacts the snow surface, a first inclined surface, and a second inclined surface, the keel base extending laterally from a longitudinal cent-al plane of the ski to a lateral extent, the first inclined surface extending between a first inflection point adjacent to the keel base and a second inflection point intersected by a longitudinally extending inflection line, the second inclined surface extending between the inflection line and a third inflection point adjacent to the generally horizontal surface, wherein the inflection line is located no farther laterally from the longitudinal central plane than is the lateral extent of the keel base, wherein the second inclined surface is between a vertical central longitudinal plane of the ski and a first straight line extending between the first inflection point and the third inflection point, and wherein the third inflection point is between the vertical central longitudinal plane and a second straight line extending between the second inflection point and an outer edge of the ski.

19. The ski for snow vehicle of claim 18, wherein the second inclined surface faces downwardly.

20. The ski for snow vehicle of claim 18, wherein the first inclined surface is generally parallel to the longitudinal central plane of the ski.

21. The ski for snow vehicle of claim 18, wherein the inflection line is located mid-way between the keel base and the generally horizontal surface.

22. The ski for snow vehicle of claim 18, wherein the second inclined surface is inclined downwardly from the third inflection point to the second inflection point when the ski is coupled with the snow vehicle.

* * * * *

UNITED STATES PATENT AND TRADEMARK OFFICE
CERTIFICATE OF CORRECTION

PATENT NO. : 7,243,927 B2  Page 1 of 1
APPLICATION NO. : 10/300158
DATED : July 17, 2007
INVENTOR(S) : Kubota Takahiko It is certified that error appears in the above-identified patent and that said Letters Patent is hereby corrected as shown below:

At column 1, line 63, please delete "ebodiment," and insert -- embodiment, --, therefor.
At column 7, line 8, please delete "F0" and insert -- $F_0$ --, therefor.
At column 8, line 15, in Claim 1, please delete "paint" and insert -- point --, therefor.
At column 8, line 35, in Claim 7, please delete "firm" and insert -- form --, therefor.
At column 9, line 26, in Claim 18, please delete "cent-al" and insert -- central --, therefor.

Signed and Sealed this

Eleventh Day of March, 2008

JON W. DUDAS
*Director of the United States Patent and Trademark Office*